(No Model.)

T. F. & M. O. GODDING.
HAY RAKE.

No. 383,454. Patented May 29, 1888.

WITNESSES:
W. D. Dodds.
H. K. Low.

INVENTOR.
Talmai F. Godding.
Milan O. Godding.
BY R. M. McDermott
their
ATTORNEY.

UNITED STATES PATENT OFFICE.

TALMAI F. GODDING, OF LONGMONT, COLORADO, AND MILAN O. GODDING, OF SANTA ANITA, CALIFORNIA.

HAY-RAKE.

SPECIFICATION forming part of Letters Patent No. 383,454, dated May 29, 1888.

Application filed September 7, 1887. Serial No. 248,995. (No model.)

*To all whom it may concern:*

Be it known that we, TALMAI F. GODDING and MILAN O. GODDING, both citizens of the United States, residing, respectively, at Longmont, in the county of Boulder and State of Colorado, and Santa Anita, in the county of Los Angeles and State of California, have invented certain new and useful Improvements in Horse Hay-Rakes; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to hay-rakes, especially to that class of rakes known as "draft-dumpers;" and it consists in certain improvements in such machines whereby their construction is simplified, cheapened, and rendered more durable and their operation more certain and reliable than those heretofore produced, as will be hereinafter fully described, and pointed out in the claim.

Figure 1:
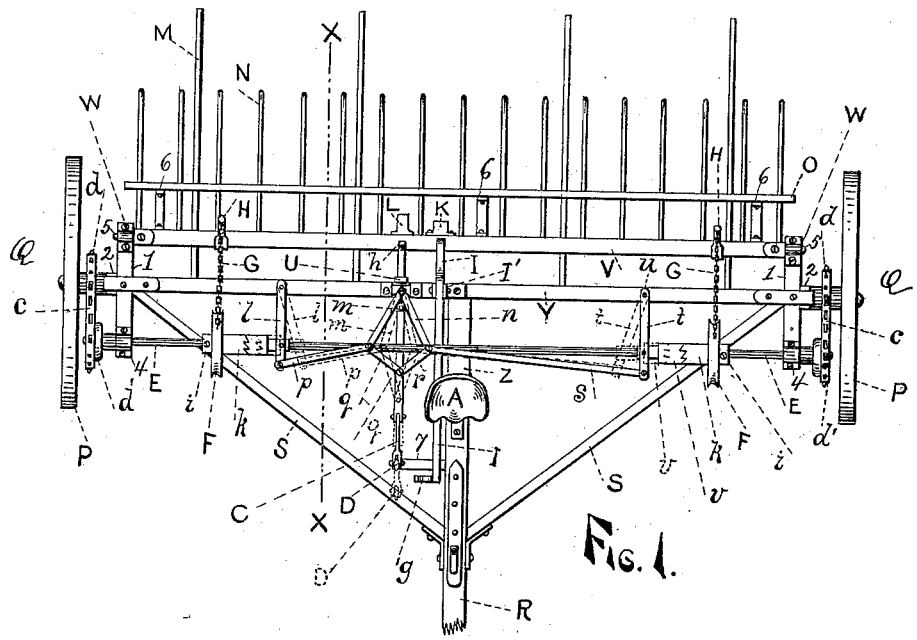
Figure 2:
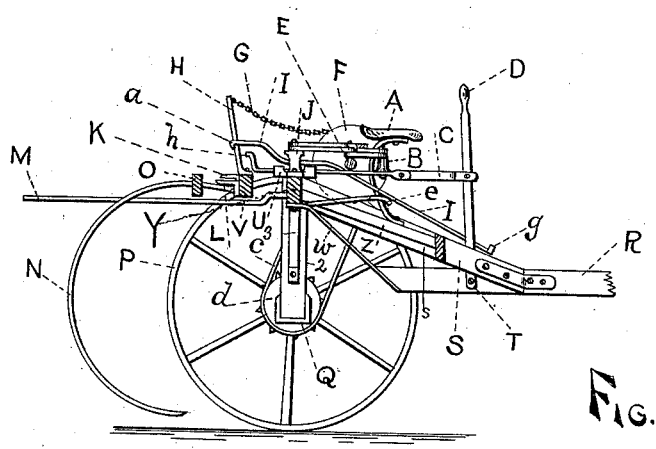

In the accompanying drawings, illustrating our invention, in which like symbols of reference designate corresponding parts, Figure 1 is a top plan view; and Fig. 2 is a sectional view taken on the line $x\ x$, Fig. 1.

Bar Y, cross-bars 1 1, uprights 2 2, tongue R, and braces S S constitute the main frame of the rake, in the rear of which is journaled, in the ends of the cross-bars 1 1, the usual rake-head, V, carrying a set of rake-teeth.

The supporting and carrying wheels P P are placed on short axles Q Q, secured to the bottom of the uprights 2 2. On the inner ends of the hubs of each of these wheels is a sprocket-wheel, $d$. Journaled in the front ends of the cross-bars 1 1 is a shaft, E, on the ends of which and in line with the sprockets $d\ d$ are fixed sprockets $d'\ d'$. On and near the ends of this shaft are also placed loose pulleys F F and clutches $v\ v$ to engage said pulleys, to cause them to turn with the shaft when desired. Collars $i\ i$ are placed on the shaft to prevent longitudinal movement of the pulleys when the clutches engage them. Endless chains are passed over the sprockets $d\ d'$ to impart motion to the said shaft. Chains G G are connected to the loose pulleys F F and to the rake-head V, so that when the loose pulleys are turned through the medium of the clutches the rake-head will turn and the rake be elevated.

A toggle-frame, $r$, is pivoted at one end upon the bar Y near its middle point. Levers $l$ and $t$, connected with the sliding sleeves or clutches $v$, are also pivoted on the bar Y. Bars $p$ and $s$ connect the toggle-frame and the free ends of the levers $l$ and $t$. A sliding bar, $h$, extending longitudinally in the machine, is connected with the toggle-frame, and has its front end connected by means of a link, C, with an operating-handle, D, pivoted in the machine, while its rear end passes through a suitable bearing or guide-piece, U, on the bar Y.

A stop or lug, L, on the rear side of the rake-head will operate the sliding bar $h$ when the rake-head is raised to release the clutches $v$ from the loose pulleys, as shown in broken lines, Fig. 1. A lever, I, having its rear end hooked, as at $a$, is pivoted on the bar Y. A spring, $e$, is secured on the frame to hold the rear or hooked end of the lever I down. A lug, K, is arranged on the rear side of the rake-head V, to engage the hook $a$ when the rake has been elevated.

The operation is as follows: When it is desired to elevate the rake, the lever D is moved rearwardly until the clutches $v$ engage the loose pulleys. The forward motion of the machine will then cause the pulleys F to turn and the rake to be elevated. When the rake has been elevated sufficiently, the lug L will strike the rear end of the bar $h$, forcing it forward, and cause the clutches to be released from the pulleys. In the meantime the lug K has passed the hooked end $a$ of the lever I, which engages said hook and prevents the descent of the rake. When desired, the rake may be lowered by pressing down against the foot-piece $g$ on the front end of the lever.

We are aware of the patent granted Genung and Blackman, November 19, 1872, No. 133,091, and therefore do not make broad claims.

What we claim, and desire to secure by Letters Patent, is—

In a horse-rake, the combination of the following parts: the shaft E, journaled in the frame and operated from the carrying-wheels, the loose pulleys F on said shaft, chains G, connecting said loose pulleys and the rake-head, sliding clutches $v$, adapted to engage the loose pulleys, the bar Y, the toggle-frame $r$, pivoted on said bar Y, bars $p$ and $s$, connecting the toggle-frame and the clutches $v$, the sliding bar $h$, connected with the toggle-frame and projecting rearwardly, a lug, L, on the rake-head, arranged to operate the bar $h$ when the rake is elevated to release the clutches, the lever I, pivoted in the frame and having a rearwardly-extending hooked end, $a$, and a lug, K, on the rake-head, arranged to engage the hooked end of the lever I when the rake is about to fall from its elevated position, all as set forth.

In testimony whereof we affix our signatures in presence of two witnesses.

TALMAI F. GODDING.
M. O. GODDING.

Witnesses to Talmai F. Godding:
F. P. SECOR,
S. P. SECOR.

Witnesses to M. O. Godding:
GEO. J. CLARKE,
N. J. CLARKE.